Nov. 22, 1927.
G. B. DAMON
1,650,495
BRIQUETTING APPARATUS
Filed Oct. 4, 1921
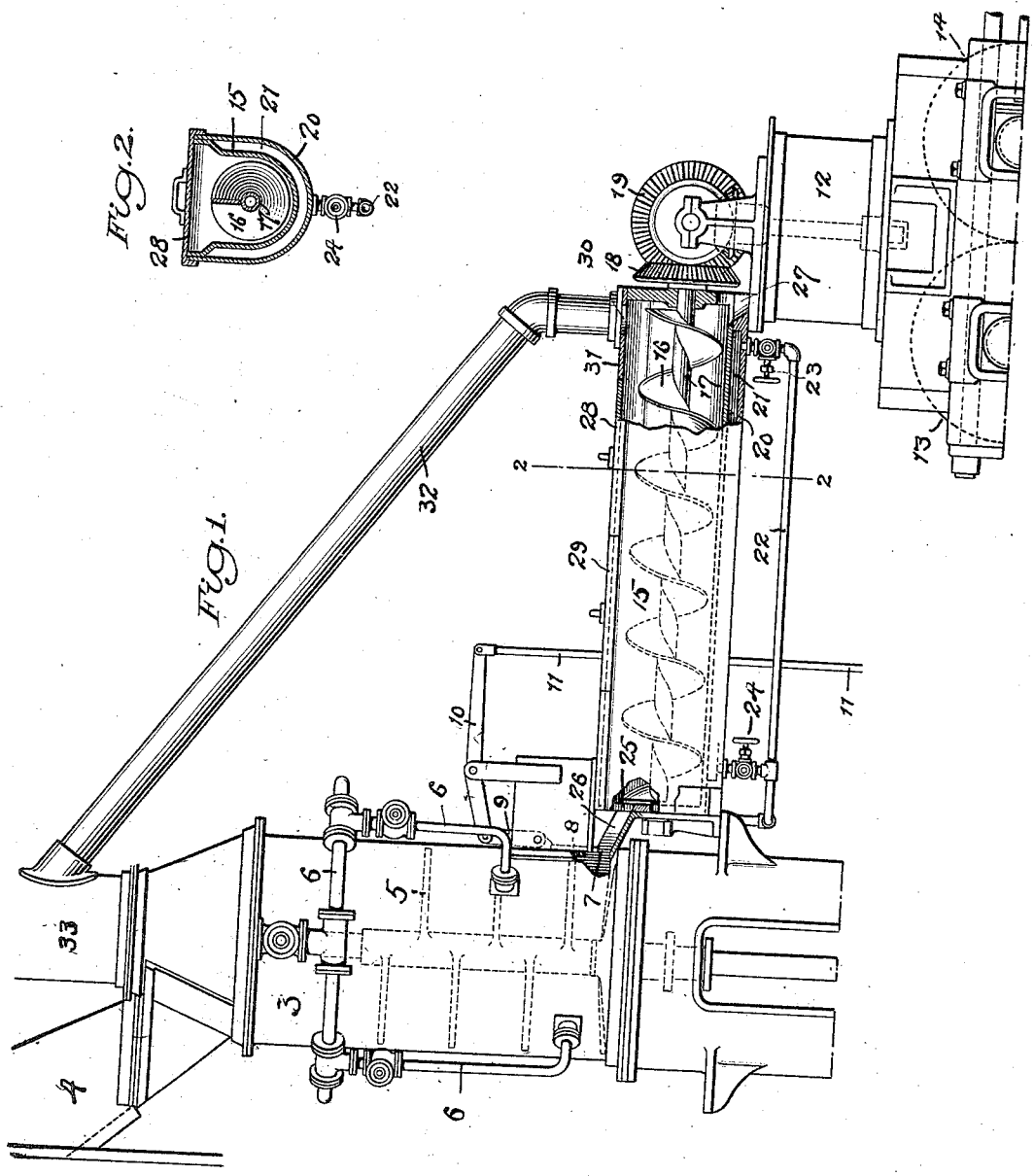
INVENTOR
GEORGE B. DAMON
BY
ATTORNEYS Patented Nov. 22, 1927.

1,650,495

UNITED STATES PATENT OFFICE.

GEORGE B. DAMON, OF BELVIDERE, NEW JERSEY, ASSIGNOR TO VULCAN IRON WORKS, OF WILKES-BARRE, PENNSYLVANIA, A CORPORATION OF PENNSYLVANIA.

BRIQUETTING APPARATUS.

Application filed October 4, 1921. Serial No. 505,436.

My invention relates to briquetting apparatus, and particularly to means for bringing the material to the briquetting press at a temperature and in a condition particularly suited for the action of the press thereon.

In the accompanying drawings—

Fig. 1 is a broken side elevation of so much of a briquetting apparatus as is necessary to illustrate the application of my invention thereto; and Fig. 2 is a section on the line 2—2, Fig. 1.

One of the practical difficulties experienced in the briquetting operation, particularly in briquetting coal fines, has been to bring the agglomerated material from the malaxator to the briquetting press at proper temperature for the best operation of the latter. The malaxator is ordinarily operated at relatively high temperature, the coal fines, tar, or other binder and ingredients of the agglomerate being generally commingled by a stirrer in the presence of superheated steam. The agglomerate usually emerges from the malaxator at a temperature of about 190 degrees F.—and in a condition too soft and mushy for the most efficient operation of the press. I have found that the press operates best upon materials of this character when the agglomerate is delivered to it at a temperature of about 160 degrees F. Hitherto, when the agglomerate has been cooled before delivery to the briquetting press, the cooling has been effected in more or less hit or miss fashion by exposure to air, or in some other crude fashion, which is not effective in delivering the material to the press at the uniform temperature best adapted for most effective operation.

By the present invention I interpose a conditioner between the malaxator and the briquetting press. The conditioner is preferably in the form of a trough in which is arranged a feeder which not only advances, but also stirs and mixes the material, while the temperature of the trough is so regulated that the agglomerate is delivered to the press at a temperature at which the latter acts to best advantage upon the material in hand. This temperature may vary very materially with different materials.

As here illustrated, the invention is applied to a briquetting apparatus comprising a malaxator 3 to which the materials are fed through a chute 4, in which they are thoroughly agglomerated by the rotary stirrer 5 in the presence of steam introduced into the chamber from steam pipes 6. At the bottom of the mixing chamber is a delivery port 7 controlled by a feed gate 8 operated through the links 9 and 10 and handle rod 11.

The conditioner is arranged between the malaxator and the press feed hopper 12, through which the agglomerate is delivered to the press rolls 13 and 14. As shown, the conditioner comprises a trough 15, within which works a longitudinally extending feed screw 16 carried on the shaft 17, which may be driven in any suitable manner, as by the beveled gears 18 and 19, from any suitable source of power. In order to bring the material in the trough to a proper temperature, the trough is provided with a jacket 20. A cooling or heating liquid, as may be necessary, is circulated through the space 21 between the trough and the jacket by means of pipes 22 and suitable control valves 23 and 24. At one end the trough has an intake opening 25, to which the chute 26 delivers the agglomerate from the malaxator at a relatively high temperature. At its opposite end the trough has a discharge port 27 opening to the hopper 12, which feeds the briquetting rolls 13 and 14. To maintain the temperature in the trough substantially uniform and controlled by the jacket, it is provided with a flat top including sectional cover plates 28 and 29, which may be readily removed to permit access to the interior of the trough for cleaning the feed screw or removing any obstructions that may occur therein. At its delivery end the trough also has a port 30 in the fixed cover section 31, to which opens the vent pipe 32 leading to the stack 33 of the malaxator for the escape of steam or fumes from the trough.

The operation of the conditioner is readily understood. The hot agglomerate coming from the malaxator is received in the trough and conveyed therethrough by the rotating screw 16 which not only further mixes the material, but causes it to travel in contact with the wall of the trough. Depending upon the nature of the agglomerate and the temperature at which it is delivered from the malaxator, the temperature of the trough wall is suitably regulated by the temperature of the jacket liquid that the temperature of the agglomerate on discharge from the trough is lowered or raised, as the case may be, to condition the material for the most efficient action of the briquetting press thereon.

Various modifications in detail of construction and operation will readily occur to those dealing with the problem, which do not depart from what I claim as my invention.

What I claim as my invention is—

1. In a briquetting apparatus, a malaxator, a press, a jacketed trough through which the material passes from the malaxator to the press, and means for passing a temperature regulating fluid through the trough jacket for the purpose set forth, together with a sectional removable cover for the trough to maintain the temperature therein substantially uniform.

2. In a briquetting apparatus, a malaxator, a press, a jacketed trough through which the material passes from the malaxator to the press, and means for passing a temperature regulating fluid through the trough jacket for the purpose set forth, together with a cover for said trough, and a vent for said cover.

3. In a briquetting apparatus, a malaxator, a stack for carrying off the vapors present in the malaxator, a press, a covered trough through which the material passes from the malaxator to the press, an open feed from the malaxator to the trough, and a venting connection from the delivery end of the trough to the malaxator stack for creating a draft through the trough from its intake towards its discharge end to carry off the trough vapors.

In testimony whereof I have signed my name to this specification.

GEORGE B. DAMON.